June 8, 1965  B. PARKER  3,187,588
TWO-DEGREE OF FREEDOM GAS BEARING GYRO
Filed June 5, 1962  2 Sheets-Sheet 1

BERNARD PARKER
INVENTOR.
BY S. A. Giarratana
ATTORNEYS

June 8, 1965 B. PARKER 3,187,588
TWO-DEGREE OF FREEDOM GAS BEARING GYRO
Filed June 5, 1962 2 Sheets-Sheet 2

BERNARD PARKER
INVENTOR.

BY S. A. Giavratona

ATTORNEYS

United States Patent Office 3,187,588
Patented June 8, 1965

3,187,588
TWO-DEGREE OF FREEDOM GAS BEARING GYRO
Bernard Parker, Teaneck, N.J., assignor to General Precision Inc., Little Falls, N.J., a corporation of Delaware
Filed June 5, 1962, Ser. No. 200,121
7 Claims. (Cl. 74—5.12)

This invention relates to gyroscopes for use in navigation systems for high speed aircraft and the like, and is particularly directed to a gas bearing gyro, suitable for use in guided missiles and the like.

It is primarily directed to a gas bearing and gas driven gyro, which is suitable for use in applications in which the operating period of the gyro is relatively short, the time required for bringing the gyro rotor up to operating speed also being extremely short, the acceleration levels to which the gyro is subjected being relatively high, the apparatus being capable of absorbing shock leads of 100 g., or more.

This application relates to gyroscopes of the type disclosed and claimed in application for U.S. Letters Patent Serial No. 120,304, now Patent No. 3,115,784, filed June 28, 1961, by Bernard Parker for "Free Rotor Gas Bearing Gyro" and assigned to the same assignee as the present invention.

A primary feature of the invention is that means is provided on the rotor of the gyro for rapidly running the rotor of the gyro up to operating speed by a supply of gas under pressure received from an external source.

Another feature is that caging means is provided to retain the rotor of the gyro on the nominal spin axis during the process of supplying gas to the rotor to run it up to operating speed.

Another feature is that gas pressure controlled means is provided to draw the caging means out of engagement with the rotor of the gyro, thereby permitting the spin axis of the gyro to be angularly displaced after the rotor is run up to its operating speed of rotation.

Another feature is that a dual gas supply, or two separate gas supplies are provided, a portion of the gas supply being adapted to run the rotor of the gyro up to its operating speed, another portion of the gas which is fed through separate and distinct passages through the housing sections of the gyro being operative to support the rotor of the gyro hydrostatically, the second portion of the gas supply being contained, after the rotor drive gas supply is cut off or exhausted.

Another feature of the gyro is that it is of the free rotor type, no gimbals or other type of conventional rotor support means being necessary.

Another feature is that the gyro rotor is accelerated to its operating speed from its initial stationary position by gas under pressure supplied by a gas propellant storage means, a separate portion of the pressurized gas supplied being utilized to hydrostatically support the gyro rotor during the operating rotation thereof, the hydrostatic bearing gas supply being continued after the rotor run up gas supply is cut off.

A primary object of the invention is to provide a small, compact gyro, having relatively few basic elements or parts, said parts being relatively simple to produce and assemble.

Another feature is that a gas pressure controlled pick-off means in which pressure variations in the spherical gap, surrounding the rotor, are indicated by variations in electrical resistance is provided to indicate the momentary angular position of the rotor of the gyro.

Another feature is that the gyro is so constructed that it can be operated at relatively high speeds, under high degrees of acceleration, without disturbing the operating of the gyro.

Another feature of the construction is that a caging mechanism is provided to retain the rotor of the gyro on a specific spin axis during the run-up period of the rotor.

A further feature is that the caging mechanism which retains the rotor in the caged position is automatically moved out of the caging position, by the pressure of gas used to drive the rotor.

Another object is to provide a gyro which is relatively simple, of low cost, and primarily suitable for installations in which the total time required for operating the gyro is relatively short.

Another object is to provide a gas-supported, gas-driven gyro, having no gimbal or other mechanical parts required to support and drive the rotor of the gyro.

The accompanying drawings, illustrative of one embodiment of the invention, together with the description of its construction and the method of operation, control, mounting, application, and utilization thereof, will serve to clarify further objects and advantages of the invention.

Figure 1:
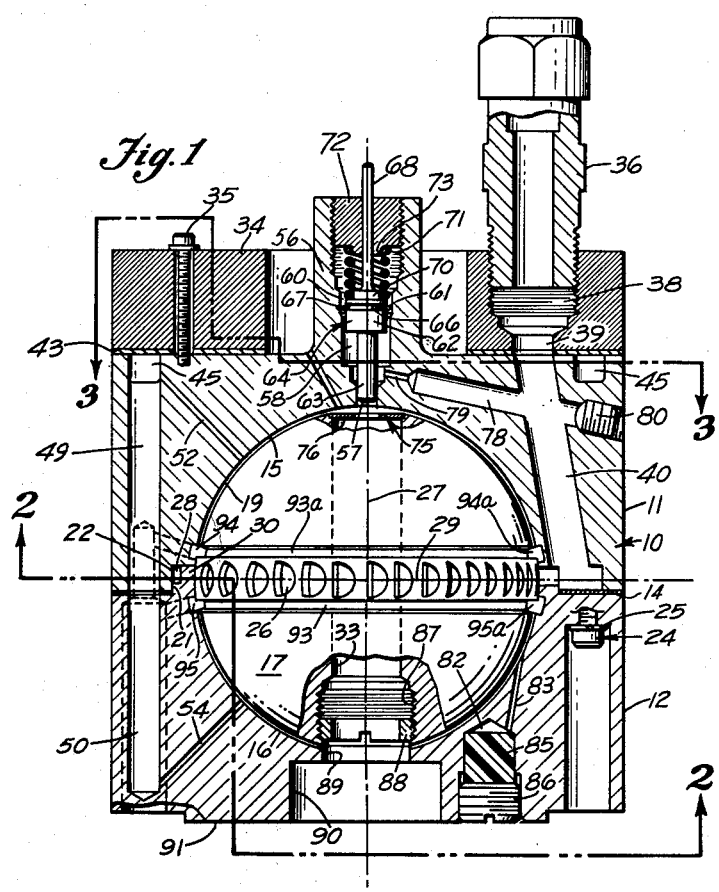
FIGURE 1 is a vertical section through one embodiment of the gas bearing gyro.

It will be understood that the following description of the construction and the method of attachment, operation, control, and utilization of the gas bearing gyro is intended as explanatory of the invention and not restrictive thereof.

In the drawings, the same reference numerals designate the same parts throughout the various views, except where otherwise indicated.

Figure 2:
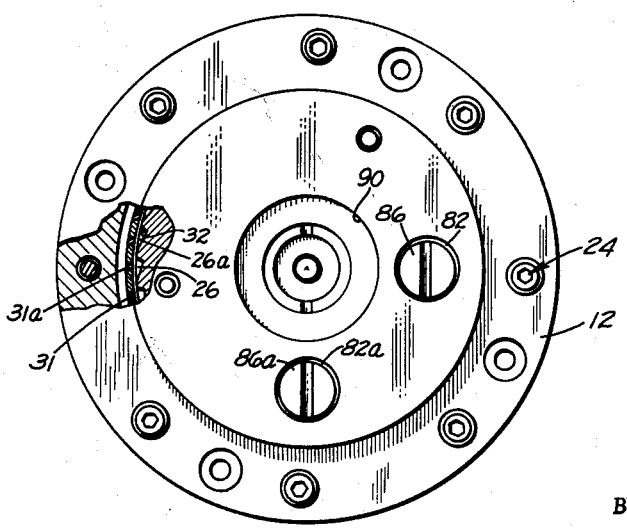
FIGURE 2 is a bottom plan view of the gyro shown in FIGURE 1, partly in section on the line 2—2, FIGURE 1.

Referring initially to FIGURES 1 and 2 the gyroscope contemplated by the invention comprises a hollow housing 10 which is formed in two sections including an upper section 11, and a lower section 12, the two housing sections having adjoining faces thereon, which are separated by a thin gasket 14. Each section of the housing has a substantially hemi-spherical cavity 15, 16 therein, the two hemi-spherical cavities forming a continuous substantially spherical cavity, into which a substantially spherical rotor 17 is rotatably fitted, a narrow substantially spherical gap 19 being formed between the outer surface of the rotor and the inner surface of the spherical cavity in the housing, the rotor being hereinafter described in greater detail.

One section 12 of the outer housing has a substantially cylindrical pilot 21, integral therewith, the pilot being fitted to a mating cylindrical counterbore 22, in the opposite or upper section of the housing shown in FIGURE 1, to accurately align the two sections of the housing, and particularly the hemi-spherical cavities 15, 16 therein, which are co-axial with the pilot 21.

The housing sections may be reversed, the pilot being integral with the upper section 11 of the housing.

The two sections of the housing are bolted, or otherwise fixedly attached to one another.

As shown in FIGURE 1, a plurality of screws 24, or other suitable attaching means, is inserted through the lower section 12 of the housing 10, the screws being threadably fitted to the upper section 11 of the housing to clamp the two sections of the housing to one another. The head of each of the screws 24 is inserted through a cylindrical counterbore in the lower section of the housing, a lock washer 25, or other suitable locking means being provided under the head of each screw to lock the screw in place.

As shown in FIGURES 1 and 2, the central portion of the rotor has a row of narrow angularly positioned blades or buckets 26, 26a cut into the outer diameter thereof, the buckets being adapted to rotate the rotor about the spin axis 27 thereof, which is co-axial with the axis of rotation of the buckets, in a manner hereinafter described.

In the normal position of the rotor, which is substantially the same as the caged position, hereinafter described, the spin axis 27 of the rotor coincides with the vertical axis of the upper and lower sections 11, 12 of the housing.

The gas impinging upon the buckets of the rotor drives the rotor as an impulse turbine.

While the gas drives the rotor, it simultaneously erects the rotor so that the spin axis of the rotor coincides with the axis of the driving torque in the position shown in FIGURE 1.

When the gas flow to the buckets 26 ceases, the rotor is free and the gyro acts as a two degree of freedom gyro.

As shown in FIGURE 1, the end of the pilot of one section of the outer housing is undercut over a relatively short length to form an annular gas passage 28 which is centered relative to the substantially horizontal axis 29 of the rotor, which is also one axis of the blades or buckets cut into the rotor.

As shown in FIGURE 2, the annular section 30 of the pilot of the housing section has a plurality angularly positioned tapered nozzle openings 31, 31a therethrough, the axis of each of the nozzle openings being substantially perpendicular to the impinging face 32 of the adjacent buckets 26, 26a around the rotor, to provide direct impingement of the gas at the driving face of the bucket of the rotor.

The nozzles provide direct communication between the annular gas passage 28 surrounding the rotor, and the buckets 26, 26a located around the rotor 17.

As shown in FIGURE 1, the rotor 17 has a substantially cylindrical central opening 33 therethrough, the opening being co-axially aligned with the vertical or nominal spin axis 27 of the rotor.

A cap 34 is attached to the upper face of the upper section 11 of the housing, a plurality of screws 35, or other attaching means being provided to clamp the cap to the upper housing section 11.

In order to supply gas under pressure to the buckets 26, 26a surrounding the rotor, a gas bottle, or other suitable gas supply source is connected to a fitting 36, which is inserted in an internally threaded opening 38 in the cap 34, the opening 38 being in direct communication with another smaller opening 39, which is directly aligned with an angularly positioned passage 40 through the upper section of the housing, the opposite end of the passage being directly connected to the annular passage 28 formed in the counterbore through the upper section 11 of the housing, the passages 40, 28 being adapted to directly connect the fitting 36 with the nozzle openings 31, 31a which supply gas under pressure to the buckets 26, 26a surrounding the rotor, thereby to drive the rotor 17 about its spin axis.

A gasket 43 is inserted between the upper section 11 of the housing, and the cap 34 to seal the cap.

In order to supply gas under pressure to support the rotor 17 within the spherical cavity in the housing sections, an annular channel 45 is cut into the upper wall of the upper section 11 of the housing, the gasket 43 between the cap 34 and the upper face of the upper section of the housing sealing the channel 45.

In order to supply gas under pressure to the annular channel 45, an internally threaded opening 47, in direct communication with the channel is cut through the cap 34, a fitting similar to the fitting shown in FIGURE 1, being inserted in the opening 47 to supply gas under pressure to the annular channel. The fitting inserted in the opening 47 may receive gas under pressure from the same gas bottle or other supply source which feeds the fitting 36 or a separate supply source may be connected to the fitting inserted in threaded opening 47.

Figure 3:
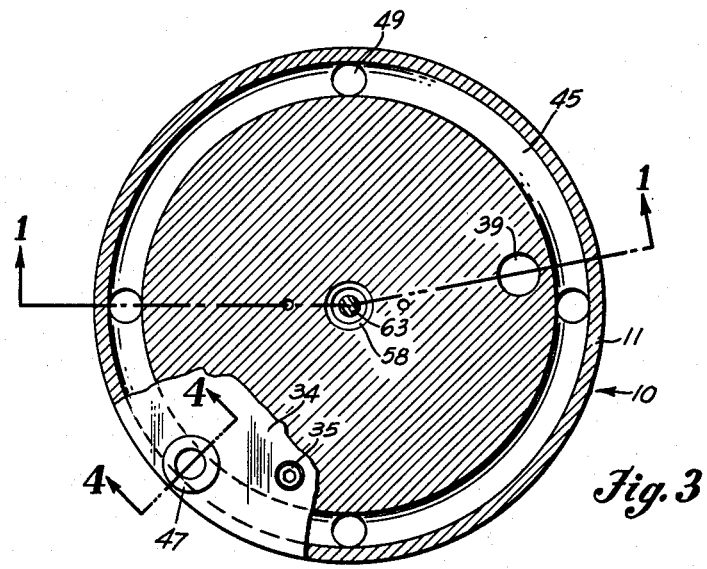
FIGURE 3 is a partial cross-sectional view taken on the line 3—3, FIGURE 1.

In order to supply gas under pressure to the spherical cavity in the interior of the housing sections 11, 12, a plurality of radially substantially vertically positioned cylindrical passages 49, 49a, such as those shown in FIGURES 1 and 3 is cut through the upper section of the housing, the openings being substantially parallel to the nominal spin axis of the rotor 17, blind end cylindrical connecting passages 50, 50a, being cut through the lower section 12 of the housing in alignment with the passages 49, 49a.

In order to connect the channel 45 and the passages 49, 49a with the interior of the housing sections, a plurality of angularly positioned openings 52 of relatively small diameter is cut through the upper section of the housing, as shown in FIGURE 1, one end of each opening being in direct communication with the annular cavity 45 or one of the longitudinal passages 49 through the upper housing section, the other end feeding directly into the hemi-spherical cavity in the upper section 11 of the housing.

As there are four longitudinal passages through the upper section of the housing shown in FIGURE 3, there would be four angularly positioned openings 52 connected therewith.

A corresponding series of angularly positioned openings 54, of relatively small diameter is cut through the lower section 12 of the housing, one end of each opening communicating directly with one of the connecting passages through the lower housing section, the opposite end communicating directly with the hemispherical cavity in the lower section 12 of the housing. There would also be four openings 54 connected to the four vertical connecting passages 50 in the lower section 12 of the housing.

These angularly positioned openings supply gas under pressure from the annular channel 45 to the spherical gap surrounding the rotor, thereby rotatably supporting the rotor, before and after it is brought up to speed by gas supplied to the radially positioned buckets 26 surrounding the rotor.

A substantially cylindrical hub 56 is formed integral with the upper end of the upper section 11 of the housing, the hub extending upward beyond the upper wall of the upper section of the housing, co-axially with the vertical axis of the housing.

A central opening 57 is cut through the center of the lower end of the hub and the corresponding portion of the upper section 11 of the housing, co-axially therewith, the opening being in direct communication with the hemi-spherical cavity 15 through the upper section 11 of the housing.

A substantially cylindrical counterbore 58 is formed in the center of the hub 56 co-axially with the opening 57 and above the opening, a seat counterbore 60 having a tapered seat 61 of arcuate cross-sectional contour being located above the counterbore 58, for reasons hereinafter described in greater detail.

In order to cage the rotor, and retain the axis of the rotor in alignment with the nominal spin axis 27 thereof, a caging mechanism is fitted to the upwardly extending hub 56 of the upper section 11 of the housing.

The caging member 62 of the caging mechanism which is fitted to the interior of the extension hub 56 includes a substantially cylindrical caging section 63, which is slidably fitted to the central opening 57 through the hub 56, the caging section 63 being adapted to extend through the hub into the hemi-spherical cavity 15 through the upper section of the housing.

Above the caging section, a substantially cylindrical body section 64 is integral with the caging member 62, the body section being slidably fitted to the counterbore 58 in the hub 56. The body section 64 of the caging member has an annular groove 66 of circular segmental cross-sectional contour cut into the upper portion thereof, the annular groove 66 being operative to receive and support an annular snap ring 67 of circular cross-section, which is fitted thereto in the manner shown in FIGURE 1.

The outer diameter of the snap ring in its free position shown in FIGURE 1 is larger than the outer diameter of the counterbore 58 in the hub 56, the snap ring being normally seated in the tapered arcuate seat 61 located above the counterbore.

Before the rotation of the rotor 17 is started, the caging member 62 is manually forced downward by means of a small diameter cylindrical stem 68, which extends upward beyond the cylindrical body 64 of the caging member, the upper end of the stem projecting beyond the upper end of the central hub 56.

A substantially cylindrical reduced diameter shoulder 70, integral with the body 64 of the caging member is located between the body 64 of the caging member and the stem 68, the stem being integral with the shoulder 70.

A coiled compression spring 71 is inserted into the interior of the hub 56 between the top of the body 64 of the caging member 62 and an externally threaded cap 72, which is threadably fitted to the internally threaded opening at the upper end of the hub 56. The threaded cap 72 has a reduced diameter shoulder 73 integral with the lower end thereof, the shoulder being fitted to the inner diameter of the compression spring 71 to center the compression spring relative to the stem 70 of the caging member.

A substantially circular plate mirror 75, having a central opening therethrough is fitted to a counterbore 76, formed at one end of the spherical rotor, the counterbore being in direct alignment with the central opening 33 through the rotor, and co-axial with the nominal spin axis 27 thereof.

When the caging member 62 is moved toward the rotor 17, by means of the stem 68 of the caging member, the snap ring 67 fitted to the groove 66 in the cylindrical body section 64 of the caging member is forced into the counterbore 58 in the hub, the caging section 63 of the caging member being fitted to the central opening through the plate mirror 57, thereby preventing angular displacement of the spin axis of the rotor, and retaining it in the position shown in FIGURE 1, relative to the vertical axis of the housing, until the caging member 62 is again forced outward in a manner hereinafter described.

The upper section 11 of the housing has an angularly positioned passage 78, therethrough, the passage 78 being operative to connect the angularly positioned passage 40 through the upper section of the housing, with the central opening through hub 56 of the upper section of the housing. A reduced diameter opening 79 is cut through the upper section 11 of the housing, in axial alignment with the angularly positioned passage, the opening 79 being in direct communication with the central counterbore 58 through the hub, thereby providing direct communication between the passage 78, the gas passage 40, and the central counterbore 58 through the hub 56 of the upper section of the housing.

In order to seal the outer end of the passage 78, a headless plug 80 is inserted into an internally threaded extension of the passage.

When the caging member is forced inward from the position shown in FIGURE 1 to the caging position, with the caging section 63 of the caging member fitted to the central opening through the plate mirror to cage the rotor, gas under pressure passes through the fitting 36 thence through the passage 40 through the upper section 11 of the housing through the nozzle openings to the buckets 26, 26a surrounding the rotor, thereby driving the rotor about the spin axis 27 thereof until the rotor reaches the desired operating speed.

A portion of the gas under pressure fed through the fitting passes through the angularly positioned passage 78 through the housing upper section 11, through the opening 79 into the central counterbore 58, through the hub 56 of the upper housing section. The gas pressure acts upon the bottom surface of the body 64 of the caging member, thereby forcing the caging member outward against the force of the compression spring 71, until the caging member reaches the uncaged position shown in FIGURE 1, with the cylindrical caging portion of the caging member out of engagement with the central opening through the plate mirror 75 fitted to the rotor 17.

This permits the axis of rotation of the rotor to be angularly displaced from the nominal spin axis 27 shown in FIGURE 1.

The lower section of the housing has a pair of closed end cavities 82 of substantially circular cross-section therein, each of the cavities extending from the bottom of the lower section of the housing to a point a short distance from the hemi-spherical cavity 16 in the lower section 12 of the housing.

As shown in FIGURE 2, the two cylindrical cavities 82, 82a are located 90° apart on the bottom surface of the lower section of the housing. The upper end of each of the cavities 82 is connected by a small angularly positioned opening 83 to the interior of the hemi-spherical cavity 16 in the lower section of the housing.

The upper portion of the cylindrical cavity 82, which is in direct communication with the angularly positioned opening 83 is filled with a pressure sensitive plastic material 85, which changes in electrical resistance with variations in gas pressure, the material which is known as a piezo-resistive material providing a direct indication of the gas pressure in the narrow gap 19 betwen the rotor and the hemi-spherical cavity in the lower section of the housing at two predetermined points, thus providing an indication of the gas pressure at two points located 90° apart in the narrow gap between the rotor 17 and the spherical cavity in the two sections of the housing.

The piezo-resistive material which is inserted in each of the cavities varies in electrical resistance with the variations in pressure, so that a reading of the electrical resistance of each of the inserts provides an indication of the gas pressure in the adjacent spherical gap, in communication with each insert. The gas pressure or resistance indications located 90° apart also provide an indication of the angular position of the rotor, as they serve to indicate the momentary position of the grooves in the rotor, relative to the locations of the openings 83, leading into the hemi-spherical cavity in the lower housing.

An externally threaded plug 86 is threadably fitted to the internally threaded extension of each of the cavities 82, 82a, thus sealing the cavities and the pressure sensitive material inserted in each cavity.

A connection is provided between each pressure sensitive insert, and an external instrument, through each plug 86 to indicate the resistance of the pressure sensitive material in each cavity 82, 82a.

The pressure sensitive pick-offs have no moving parts, and are capable of transmitting an electrical signal to control an autopilot.

The pressure sensitive pick-offs are located between the inlet point, through which gas to hydrostatically support the gyro rotor is fed, and the exhaust points of said gyro rotor. The momentary exhaust point of the rotor is a function of rotor position. The position of the grooves 93, 93a at the sides of the buckets of the rotor, at any position of the rotor establishes the exhaust points. The position of the gas exhaust from the rotor is varied relative to the inlet gas fed to the narrow gap between the inner surface of the housing sections and rotor.

The end of the rotor opposite the plate mirror has a larger internally threaded opening 87 therethrough in axial alignment with the opening 33. An externally threaded tubular nut 88 is threadably fitted to the larger opening 87 through the rotor to close the opening. The tubular nut 88 has a screw slot therethrough to facilitate insertion of the nut into the opening.

The tubular nut 88 serves essentially as a balance weight to balance the rotor 17 of the gyro.

The lower section 12 of the housing 10 has a central opening 89 therethrough in nominal axial alignment with the central opening 33 through the rotor in the position shown in FIGURE 1. A substantially circular counterbore 90 is cut into the bottom face of the lower section of the housing co-axially with the opening 89. In normal mounting, the assembled gyro is mounted with the bottom face 91 of the lower section of the housing adjacent the gyro support member.

The face of the plate mirror 75 directed toward the central opening 33 through the center of the rotor is polished or coated with a reflecting material, to reflect light through the rotor.

In order to initially cage the rotor 17 of the gyro, the rotor is manually rocked until the central opening through the mirror plate 75 is aligned with the caging section 63 of the caging member of the gyro.

The caging member 62 is then manually fed inward toward the rotor of the gyro, by means of the stem 68 of the caging member, until the caging section 63 of the caging member fits through the opening through the plate mirror 75, thus retaining the rotor on the nominal spin axis 27, shown in FIGURE 1.

The reflecting surface of the plate mirror 75 is utilized as a means to determine the accuracy of the nominal position of the rotor 17 of the gyro, relative to the mounting face which supports the lower housing section 12 of the gyro in the aircraft.

A pair of substantially parallel channels 93, 93a are cut around the outer diameter of the rotor 17, adjacent the sides of the row of buckets 26, 26a. These grooves 93, 93a allow the gas discharged from the buckets to pass through the channels 94, 95 surrounding the rotor 17.

A mating channel 94, 94a is cut around the hemispherical inner surface of the upper section 11 of the housing, in direct communication with the upper channel 93, surrounding the rotor and a second mating channel 95, 95a cut through the hemi-spherical inner cavity 16 through the lower housing section 12 in direct communication with the lower channel 93a, surrounding the rotor.

These channels 94, 95, which are nominally aligned with the channels 93, 93a surrounding the rotor 17, provide a pair of continuous channels to allow gas discharged from the pockets surrounding the rotor 17 to be removed.

The channels 94, 95 through the housing sections are connected with an opening through one of the housing sections, to allow gas collected in the channels 94, 95 through the housing, and the mating channels surrounding the rotor to be discharged into the atmosphere or a suitable receptacle.

The operation of the gyro is substantially as follows:

A gas bottle or other supply of gas under pressure is connected to the fitting 36 inserted in the cap 34 attached to the upper section 11 of the housing.

The gas under pressure from the fitting 36 passes through the angular passage 40 through the upper section 11 of the housing, thence through the annular channel 28 surrounding the inner surfaces of the upper and lower sections 11, 12 of the housing, the gas passing through the nozzle openings through the annular ring 30 surrounding the hemi-spherical cavities through the upper and lower sections 11, 12 of the housing.

The gas under pressure from the nozzle openings impinges upon the buckets 26, 26a cut into the rotor, thereby initiating the rotation of the rotor, which is caged in the position shown in FIGURE 1. At full speed, the rotor 17 attains a speed as high as 50,000 revolutions per minute, in a relatively short time interval, representing a fraction of a second, the time and speed of the rotor depending upon the pressure and volume of the gas supplied through the fitting 36.

Figure 4:
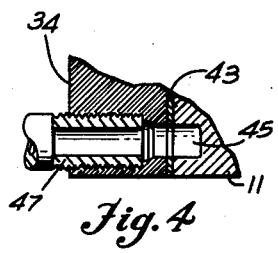
FIGURE 4 is a fragmentary sectional view taken on line 4—4 of FIGURE 3.

A portion of the gas supplied to the rotor, or an additional supply of gas under pressure is fed through the gas inlet 47 shown in FIGURE 4, through the annular channel 45 at the upper end of the upper section of the housing, thence through the substantially vertical passages 49 through the upper section of the housing, through the connecting passages 50 through the lower section of the housing, the gas passing through the angularly positioned openings 52 through the upper section 11 of the housing, and the corresponding angularly positioned openings 54 through the lower section 12 of the housing to the spherical gap 19 formed between the inner surfaces of the housing and the rotor 17.

The rotor is driven up to its required operating speed by the gas under pressure supplied to the buckets surrounding the rotor.

While the rotor is being driven to the required speed, a portion of the gas used to drive the rotor, is fed to the counterbore surrounding the caging member, thereby uncaging the rotor in the manner hereinbefore described.

The supply of gas to drive the rotor is cut off at a pretermined time. The rotor is then free to function as a free rotor gyro.

After the rotor of the gyro is uncaged, the outer housing sections may be angularly displaced to any angular position, relative to the nominal rotor spin axis shown in FIGURE 1, depending upon the attitude of the vehicle by which the gyro is supported.

The supply of gas to the spherical gap, between the rotor and the inner surface of the housing sections, continues during the entire period during which the gyro is in operation, even after the gas supply to the buckets of the rotor is cut off.

A portion of the driving gas fed through the passage 40 through the upper section of the housing passes through the connecting passage 78, thence through the opening 79, to the counterbore 58 surrounding the caging member 62. This gas impinges upon the lower surface of the body 64 of the caging member 62, thereby elevating the caging member from the caging position, with the caging section of the caging member fitted through the central opening in the plate mirror.

The continued supply of gas under pressure forces the caging member 62 outward against the pressure of the compression spring 71 until the snap ring 67 surrounding the body of the caging member drops into the seating section 61 of the seat counterbore 60 in the hub 56 integral with the upper section 11 of the housing, the snap ring 67 in combination with the seating section 61 of the counterbore retaining the caging member in the uncaged position shown in FIGURE 1, against the pressure of the compression spring 71.

After the rotor is mechanically uncaged, the position of the buckets relative to the rotor tends to render the rotor self-caging so that it remains on the nominal spin axis shown in FIGURE 1, until full rotor speed is attained.

The rotor is continuously hydrostatically supported by the gas under pressure which passes from the inlet opening 47 through the angularly positioned openings 52, 54 to the spherical gap 19 surrounding the rotor 17.

The rotation of the rotor continues for several minutes, usually about 3 or 4 minutes after the run-up gas supply is cut off, as long as the rotor is supported by the auxiliary hydrostatic gas supply.

The actual operation in a missile or similar vehicle consumes less than one minute, so that the speed of the rotor during the operating period is substantially equal to or slightly less than the run-up speed. This applies regardless of the angular position of the sections 11, 12 of the housing relative to the spin axis of the rotor.

The resistance signals, transmitted from the two pressure sensitive pick-offs, provide an indication at the angular position of the spin axis of the rotor, relative to the nominal position thereof, shown in FIGURE 1.

A separate gas supply supplied through the auxiliary inlet opening 47 through the cap attached to the upper section 11 of the housing is maintained to provide a continuous hydrostatic support for the rotor of the gyro, during the entire period during which the gyro is in operation.

While the gyro is supported hydrostatically it will withstand severe shock loads which are estimated even as high as 300 gs. This enables the gyro to withstand shock loads of missile launchings even under the most severe conditions.

The pick-off means hereinbefore described can be changed to a capacitive or inductive type pick-off.

The rotor drive may be of the reaction type.

In place of the rotor drive means hereinbefore described, the rotor drive means may be of the energy storage type. Thus a wound torsion spring, one end of which is attached to the rotor, may be utilized as a means of driving the rotor to its operating speed.

Although but one preferred embodiment of the invention has been illustrated and described, it will be apparent to those skilled in the art that many changes may be in the preferred two-axis gas driven gyro as illustrated and described without departing from the spirit and scope of this invention. Accordingly, this invention is to be considered as being limited only by the following claims appended thereto.

What is claimed is:

1. A free-rotor gyro, comprising a housing enclosing a substantially spherical cavity, a substantially spherical rotor rotatably disposed in said spherical cavity and defining therewith a substantially spherical gap, formed between the inner surface of the spherical cavity and the outer surface of the rotor, drive means on the outer circumference of said rotor operative to receive a supply of gas under pressure to rotatably drive the rotor about the spin axis thereof, passage means formed in said housnig operative to supply gas under pressure from an external source to the drive means on the outer circumference of said rotor, to rotatably drive the rotor, auxiliary passage means formed in said housing operative to provide gas under pressure to the spherical gap surrounding the rotor, to hydrostatically support the rotor, means defining a central opening through said rotor, in axial alignment with the spin axis thereof, a caging support member fitted to the rotor, co-axially with the longitudinal axis of the central opening through the rotor, said caging support member having a central opening therethrough, the housing having an opening therethrough in axial alignment with the spin axis of the rotor, a caging member fitted to said housing for sliding movement along said spin axis between two limit positions, said caging member having means formed thereon operative to fit into the opening through the caging support member, to cage the rotor when said caging member is in one of said limit positions, means normally resiliently biasing said caging member toward said one limit position, and additional passage means in said housing for supplying gas under pressure to said caging member to move said caging member to the other limit position when gas is supplied to said first mentioned passage means and auxiliary passage means.

2. A two-degree of freedom gyro, comprising a housing enclosing a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means formed in said housing, operative to supply gas under pressure from an external source to said drive means; auxiliary passage means formed in said housing operative to provide gas under pressure to said spherical gap, to hydrostatically support the rotor; a pair of spaced, pressure-responsive means, fitted to the housing in communication with said spherical gap at respective locations angularly spaced 90° about the spin axis, adapted to indicate the angular displacement of the actual spin axis of the rotor relative to the nominal spin axis thereof, the means formed on the outer circumference of said rotor operative to receive a supply of gas under pressure including a plurality of equally-spaced radially positioned depressed buckets cut into the circumferential outer surface of the rotor, said buckets being radially centered about the spin axis of the rotor, the supply of gas under pressure from the gas supply passage means in the housing being adapted to impinge upon the radially positioned buckets surrounding the rotor, thereby to rotatably drive the rotor about the spin axis thereof, the rotor having a central opening therethrough in axial alignment with the nominal spin axis of the rotor, a caging support member attached to the rotor, co-axially with the central opening through the rotor, said caging support member having a central opening therethrough, the housing having a caging opening therethrough, in axial alignment with the nominal spin axis of the rotor, a caging member slidably fitted to said caging opening, said caging member having means formed thereon operative to fit into the central opening through the caging support member, to cage the rotor, thereby to prevent angular displacement of the spin axis of the rotor relative to the nominal spin axis thereof, the housing having an auxiliary gas passage therethrough, in direct communication with the pressurized gas supply passage means in said housing, said auxiliary gas passage being in direct communication with the caging opening, a portion of the gas under pressure from the gas supply passage means passing through the auxiliary gas passage being adapted to impinge longitudinally upon a portion of caging member, thereby to force the caging member radially outward relative to the rotor, out of engagement with the caging support member attached to the rotor, while the supply of gas to the radially positioned buckets, surrounding the rotor continues, the rotation of the rotor continuing on a self-caging basis until the supply of gas to the buckets surrounding the rotor is cut off.

3. A two-degree of freedom gyro, comprising a housing enclosing a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means formed in said housing, operative to supply gas under pressure from an external source to said drive means; auxiliary passage means formed in said housing operative to provide gas under pressure to said spherical gap, to hydrostatically support the rotor; a pair of spaced, pressure-responsive means, fitted to the housing in communication with said spherical gap at respective locations angularly spaced 90° about the spin axis, adapted to indicate the angular displacement of the actual spin axis of the rotor relative to the nominal spin axis thereof, the means formed on the outer circumference of the rotor operative to receive a supply of gas under pressure including a plurality of equally-spaced radially positioned depressed buckets cut into the circumferential outer surface of the rotor, said buckets being radially centered about the spin axis of the rotor, the housing having an annular wall radially centered about the nominal spin axis of the rotor, the passage means formed in the housing operative to transmit gas under pressure from an external source including an annular passage surrounding the annular wall of the housing, the annular wall of the housing section having a plurality of tapered nozzle openings therethrough, the axis of each of said nozzle openings being nominally tangentially positioned relative to the buckets surrounding the rotor, said nozzle openings being in direct communication with the spherical cavity in the housing, the nozzle openings through the annular wall of the housing being adapted to direct gas under pressure from the annular passage surrounding the annular wall of the housing, toward the buckets surrounding the rotor, thereby to rotatably drive the rotor.

4. A two-degree of freedom gyro, comprising a housing enclosing a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means formed in said housing, operative to supply gas under pressure from an external source to said drive means; auxiliary passage means formed in said housing operative to provide gas under pressure to said spherical gap, to hydrostatically support the rotor; a pair of spaced, pressure-responsive means, fitted to the housing in communication with said spherical gap at respective locations angularly spaced 90° about the spin axis, adapted to indicate the angular displacement of the actual spin axis of the rotor relative to the nominal spin axis thereof, the means formed on the outer circumference of the rotor operative to receive a supply of gas under pressure including a plurality of equally-spaced radially positioned depressed buckets cut into the circumferential outer surface of the rotor, said buckets being radially centered about the nominal spin axis of the rotor, the supply of gas under pressure from the gas supply passage means in the two housing sections being adapted to impinge upon the radially positioned buckets surrounding the rotor, thereby to rotatably drive the rotor about the spin axis thereof, the rotor having a pair of circumferential grooves around the outer circumference thereof, said grooves being radially centered relative to the spin axis of the rotor, each of said grooves being located adjacent one end of the radially positioned buckets cut into the outer circumference of the rotor, the housing having adjacent each of the grooves in the rotor, a circumferential groove therein, each of said circumferential grooves of the housing being in direct communication with one of the circumferential grooves surrounding the rotor, when the rotor is located in its nominal position relative to the housing sections, the housing having passage means therethrough in communication with the circumferential grooves of the housing, the gas under pressure from the radially positioned buckets in the rotor being adapted to pass through the circumferential grooves surrounding the rotor, thence through the circumferential grooves of the housing, then out through the passage means connected to the circumferential grooves of the housing.

5. A two-degree of freedom gyro, comprising a housing enclosing a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means formed in said housing, operative to supply gas under pressure from an external source to said drive means; auxiliary passage means formed in said housing operative to provide gas under pressure to said spherical gap, to hydrostatically support the rotor; a pair of spaced, pressure-responsive means, fitted to the housing in communication with said spherical gap at respective locations angularly spaced 90° about the spin axis, adapted to indicate the angular displacement of the actual spin axis of the rotor relative to the nominal spin axis thereof, the means formed around the outer circumference of the rotor operative to receive a supply of gas under pressure including a plurality of equally-spaced radially positioned depressed buckets cut into the circumferential outer surface of the rotor, said buckets being radially centered about the nominal spin axis of the rotor, a cage receiving member fitted to the rotor, co-axially with the central opening therethrough, said cage receiving member having a central opening therethrough, the housing having a hub extending radially outward therefrom, the hub being co-axial with the nominal spin axis of the rotor, said hub having a central opening therethrough co-axial with the nominal spin axis of the rotor and extending into the spherical cavity in the housing, the hub having a cylindrical counterbore formed therein, co-axially with the central opening therethrough and extending axially outward beyond the central opening, a caging member fitted to said hub, said caging member including a cylindrical body section slidably fitted to the counterbore in the hub, a cylindrical caging section integral with the body section, said caging section extending through the central opening through the hub, the caging section of the caging member being adapted to fit into the central opening through the cage-receiving member, to cage the rotor about the nominal spin axis thereof, when the caging member is moved toward the rotor, resilient means fitted to the outer end of the body section of the caging member, adapted to normally urge the caging member toward the rotor, the housing having an auxiliary gas passage therethrough in direct communication with said pressurized gas supply passage means, said auxiliary gas passage being in direct communication with the cylindrical counterbore through the hub, a portion of the gas under pressure from the gas supply passage means, passing through the auxiliary passage being adapted to longitudinally impinge upon the cylindrical body section of the caging member, thereby to force the caging member radially outward relative to the rotor, the cylindrical caging section of the caging member being moved out of engagement with the central opening through the cage-receiving member, while the supply of gas to the buckets surrounding the rotor continues the rotation of the rotor continuing on a self-caging basis until the supply of gas to the buckets surrounding the rotor is cut off.

6. A two-degree of freedom gyro, comprising a housing formed in two sections coaxial with one another, each section of said housing having a spherical segmental cavity in the interior thereof, means fixedly attaching the two sections of the housing to one another, the spherical segmental cavities in the two sections of the housing combining to form a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means in the sections of the housing operative to supply gas under pressure from an external source to said drive means; auxiliary passage means in said housing sections operative to provide gas under pressure to said spherical gap to hydrostatically support the rotor; a pair of spaced, pressure-responsive means fitted to one section of the housing, in communication with said spherical gap, adapted to indicate the angular displacement of the actual spin axis of the rotor, relative to the nominal spin axis thereof, the means formed on the outer circumference of the rotor operative to receive a supply of gas under pressure including a plurality of equally-spaced radially positioned buckets, cut into the circumferential outer surface of the rotor, said buckets being radially centered about the spin axis of the rotor, the supply of gas under pressure from the gas supply passage means in the housing sections being adapted to impinge upon the radially positioned buckets surrounding the rotor, thereby to rotatably drive the rotor about the spin axis thereof, the rotor having a pair of circumferential grooves around the outer circumference thereof, said grooves being radially centered relative to the spin axis of the rotor, each of said grooves being located adjacent one end of the radially positioned buckets cut into the outer circumference of the rotor, and in communication therewith, the interior of each section of the housing, adjacent each of the grooves in the rotor, having a circumferential groove therein, each of said circumferential grooves being in direct communication with one of the circumferential grooves in the rotor, when the spin axis of the rotor is located in its nominal position, each of the housing sections having passage means therethrough in communication with the circumferential groove through the housing section, the gas under pressure exhausting from the radially positioned buckets being adapted to pass through the circumferential grooves surrounding the rotor, thence through the circumferential grooves through the spherical segmental cavities in the housing sections and out through the passage means connected to the circumferential grooves through the housing sections, the second section of the housing having a pair of substantially cylindrical blind cavities therein, the cylindrical cavities being directed toward the spherical segmental cavity in the second housing section, the first of said cylindrical cavities being located on one axis of the housing sections, the second cylindrical cavity being located on a second axis of the housing sections, substantially perpendicular to the first axis, the second housing section having a pair of openings therethrough, each of said openings being operative to provide direct communication between the spherical gap surrounding the rotor and one of the cylindrical cavities in the second housing section, the pressure responsive means being a pressure sensitive material inserted in each of the cylindrical cavities in the second housing section, the pressure sensitive material in the first of said cylindrical cavities being exposed to the gas pressure supplied through one of the openings in communication with the spherical gap surrounding the rotor, the pressure sensitive material in the second cylindrical cavity being exposed to the exhaust gas pressure from the circumferential grooves surrounding the spherical inner surface of the housing sections, means adapted to transmit through the second housing section to an external point the electrical resistance of the pressure sensitive material in each of said cylindrical cavities, the electrical resistances of the pressure sensitive material in each cylindrical cavity being adapted to indicate the momentary pressure to which each of said pressure sensitive materials is exposed, thereby to indicate the momentary angular displacement of the spin axis of the rotor, relative to the nominal position thereof, about the axis of the housing sections on which the cavity containing the pressure sensitive material is located.

7. A two-degree of freedom gyro, comprising a housing formed in two sections coaxial with one another, each section of said housing having a spherical segmental cavity in the interior thereof, means fixedly attaching the two sections of the housing to one another, the spherical segmental cavities in the two sections of the housing combining to form a substantially spherical cavity; a substantially spherical rotor rotatably fitted to said cavity and defining therewith a substantially spherical gap formed between the inner surface of the cavity and the outer surface of the rotor; means formed on the outer circumference of said rotor operative to receive a supply of gas under pressure to rotatably drive the rotor about the spin axis thereof; passage means in the sections of the housing operative to supply gas under pressure from an external source to said drive means; auxiliary passage means in said housing sections operative to provide gas under pressure to said spherical gap to hydrostatically support the rotor; a pair of spaced, pressure-responsive means fitted to one section of the housing, in communication with said spherical gap, adapted to indicate the angular displacement of the actual spin axis of the rotor, relative to the nominal spin axis thereof, the means formed around the outer circumference of the rotor, operative to receive a supply of gas under pressure including a plurality of equally-spaced radially positioned depressed buckets cut into the circumferential outer surface of the rotor, said buckets being radially centered about the spin axis of the rotor, the supply of gas under pressure from the gas supply passage means through the two housing sections being adapted to impinge upon the radially positioned buckets surrounding the rotor, thereby to rotatably drive the rotor about the spin axis thereof, a cage-receiving member attached to the rotor, said cage-receiving member having a central opening therethrough, co-axially aligned with the spin axis of the rotor, the first section of the housing having a hub extending radially outward therefrom, the hub being co-axial with the nominal spin axis of the rotor, the hub having a central opening therethrough, the central opening being co-axial with the nominal spin axis of the rotor, and extending into the spherical segmental cavity in the first housing section, the hub having a first cylindrical counterbore therein, co-axial with the central opening and extending axially beyond the central opening through the hub, the hub having a second seating counterbore therein, co-axially aligned with the first counterbore, and extending axially outward beyond the first counterbore, the second counterbore having a seating section of arcuate cross-sectional contour therein, a caging member slidably fitted to the hub of the first housing section, said caging member including a cylindrical body section slidably fitted to the first counterbore in the hub, a cylindrical caging section integral with the body section, said caging section extending through the central opening through the hub, the caging section of the caging member being adapted to fit into the central opening through the cage-receiving member, to cage the rotor about the nominal spin axis thereof, when the caging member is moved toward the rotor, the body of the caging member having a groove of circular segmental cross-section around the outer circumference thereof, a snap ring of substantially circular cross-section fitted to the groove in the body of the caging member, said snap ring being adapted to be seated in the arcuate seat in the second seating counterbore of the hub to retain the caging section of the caging member out of engagement with the cage-receiving member thereby to free the rotor, an extension integral with the body of the caging member, projecting axially outward beyond the outer end of the hub, said extension being utilizable for manually moving the caging member toward the rotor, thereby to move the caging section of the caging member into the central opening through the cage-receiving member to cage the rotor, and spring means surrounding said extension in engagement with the outer end of the cylindrical body section of the caging member, said spring means being operative to normally urge the caging member toward the spherical segmental cavity in the housing section, the extent of the movement of the caging member being limited by the snap ring surrounding the body of the caging member, when said snap ring engages the arcuate seat in the second seating counterbore, thereby limiting the movement of the caging member toward the rotor.

References Cited by the Examiner

UNITED STATES PATENTS

| | | | |
|---|---|---|---|
| 2,098,564 | 11/37 | Carter et al. | 74—5 X |
| 2,872,821 | 2/59 | Derossi | 74—5.1 |

FOREIGN PATENTS 329,082   5/58   Switzerland.

BROUGHTON G. DURHAM, *Primary Examiner.*

DON A. WAITE, *Examiner.*